US011881166B2

(12) United States Patent
Hong et al.

(10) Patent No.: US 11,881,166 B2
(45) Date of Patent: Jan. 23, 2024

(54) ELECTROLUMINESCENT DISPLAY DEVICE AND METHOD FOR DRIVING SAME

(71) Applicant: LG Display Co., Ltd., Seoul (KR)

(72) Inventors: Yu Min Hong, Seoul (KR); Tae Wook Kim, Yongin-si (KR); Jung Hyeon Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/538,404

(22) Filed: Nov. 30, 2021

(65) Prior Publication Data

US 2022/0189400 A1 Jun. 16, 2022

(30) Foreign Application Priority Data

Dec. 11, 2020 (KR) ........................ 10-2020-0173603

(51) Int. Cl.

*G09G 3/3233* (2016.01)
*G09G 3/3275* (2016.01)

(52) U.S. Cl.

CPC ......... *G09G 3/3233* (2013.01); *G09G 3/3275* (2013.01); *G09G 2310/027* (2013.01); *G09G 2310/08* (2013.01); *G09G 2320/0233* (2013.01); *G09G 2320/0295* (2013.01); *G09G 2320/045* (2013.01)

(58) Field of Classification Search

CPC ............... G09G 3/3233; G09G 3/3275; G09G 2310/027; G09G 2310/08; G09G 2320/0233; G09G 2320/0295; G09G 2320/045

See application file for complete search history.

(56) References Cited

U.S. PATENT DOCUMENTS

| | | | | |
|---|---|---|---|---|
| 8,477,086 B2 * | 7/2013 | Miyamoto | ........... | G09G 3/3233 345/76 |
| 9,230,478 B2 | 1/2016 | Byeon et al. | | |
| 9,245,472 B2 | 1/2016 | Jang et al. | | |
| 9,715,848 B2 | 7/2017 | Kim et al. | | |
| 10,629,118 B2 | 4/2020 | Choi et al. | | |

(Continued)

FOREIGN PATENT DOCUMENTS

| | | |
|---|---|---|
| CN | 103871360 A | 6/2014 |
| CN | 103871364 A | 6/2014 |

(Continued)

OTHER PUBLICATIONS

China National Intellectual Property Administration, Office Action, Chinese Patent Application No. 202111487224.6, dated Oct. 18, 2023, 20 pages.

*Primary Examiner* — Jeff Piziali
(74) *Attorney, Agent, or Firm* — Fenwick & West LLP

(57) ABSTRACT

Electroluminescent display devices and a method for driving the same are disclosed. An electroluminescent display device according to an embodiment of the present disclosure includes a display panel including a plurality of pixels emitting light according to image data, a first memory storing a stress accumulation value corresponding to the image data, and a compensation gain calculation circuit configured to increase a compensation gain for compensating for the image data on the basis of the stress accumulation value, wherein the stress accumulation value in the first memory is reset whenever the compensation gain increases.

14 Claims, 8 Drawing Sheets

(56) References Cited

U.S. PATENT DOCUMENTS

| | | | |
|---|---|---|---|
| 10,861,387 B2 | 12/2020 | Kim et al. | |
| 11,062,660 B1 * | 7/2021 | Sohn | G09G 3/006 |
| 2014/0168039 A1 * | 6/2014 | Kim | G09G 3/3208 345/82 |
| 2014/0168129 A1 | 6/2014 | Miyazaki et al. | |
| 2014/0168191 A1 | 6/2014 | Byeon et al. | |
| 2014/0176409 A1 * | 6/2014 | Kim | G09G 3/3233 345/92 |
| 2014/0184655 A1 | 7/2014 | Jang et al. | |
| 2015/0161968 A1 * | 6/2015 | Hayashi | G09G 3/3291 345/82 |
| 2016/0343301 A1 | 11/2016 | Choi et al. | |
| 2018/0151117 A1 | 5/2018 | Choi et al. | |
| 2019/0027097 A1 * | 1/2019 | Kato | G09G 3/3225 |
| 2019/0156746 A1 | 5/2019 | Kim et al. | |
| 2019/0289308 A1 * | 9/2019 | Mobasher | G09G 3/20 |
| 2021/0210014 A1 * | 7/2021 | Kim | G09G 3/3233 |

FOREIGN PATENT DOCUMENTS

| | | |
|---|---|---|
| KR | 10-2010-0046458 A | 5/2010 |
| KR | 10-2014-0086620 A | 7/2014 |
| KR | 10-2016-0137216 A | 11/2016 |
| KR | 10-2018-0013189 A | 2/2018 |
| KR | 10-2018-0061450 A | 6/2018 |
| KR | 10-2019-0106380 A | 9/2019 |
| KR | 10-2020-0017991 A | 2/2020 |

* cited by examiner

| Input \ Output | Accumulation Th |
|---|---|
| Gain0 | Th0 |
| Gain1 | Th1 |
| Gain2 | Th2 |
| Gain3 | Th3 |
| ⋮ | ⋮ |

<LUT>

| Gain(8bit) | Luminance range1~2 | Luminance range2~10 |
|---|---|---|
| Gain0 | 1 | 2 |
| Gain1 | 1.004 | 2.031 |
| Gain2 | 1.008 | 2.063 |
| ... | ... | ... |
| Gain254 | 1.992 | 9.938 |
| Gain255 | 1.996 | 9.969 |

ELECTROLUMINESCENT DISPLAY DEVICE AND METHOD FOR DRIVING SAME

CROSS-REFERENCE TO RELATED APPLICATIONS

This application claims the benefit of Korean Patent Application No. 10-2020-0173603, filed on Dec. 11, 2020, which is hereby incorporated by reference as if fully set forth herein.

BACKGROUND OF THE INVENTION

Field of the Invention

The present disclosure relates to an electroluminescent display device and a method for driving the same.

Discussion of the Related Art

Electroluminescent display devices are divided into inorganic electroluminescent display devices and organic electroluminescent display devices according to materials of emission layers. Each pixel of the electroluminescent display device includes a self-luminescent light-emitting element and adjusts luminance by controlling the amount of luminescence of the light-emitting element according to grayscales of image data. Each pixel circuit may include a driving element.

Pixel deterioration characteristics may vary in pixels with lapse of driving time. When deterioration deviations between pixels occur, emission current causing emission of light varies in pixels even if the same data voltage is applied to the pixels. Such an emission current deviation causes luminance nonuniformity, resulting in deterioration in image quality.

Although various attempts to compensate for deterioration deviations between pixels in an electroluminescent display device have been made, these attempts have problems that a large capacity memory is required and an initial starting time increases when the electroluminescent display device is powered on.

SUMMARY OF THE INVENTION

Accordingly, to solve the aforementioned problems, embodiments of the present disclosure provide an electroluminescent display device and a method for driving the same to reduce memory capacity necessary to compensate for a deterioration deviation between pixels.

An electroluminescent display device according to an embodiment of the present disclosure includes a display panel including a plurality of pixels emitting light according to image data, a first memory storing a stress accumulation value corresponding to the image data, and a compensation gain calculation circuit configured to increase a compensation gain for compensating for the image data on the basis of the stress accumulation value, wherein the stress accumulation value in the first memory is reset whenever the compensation gain increases.

An electroluminescent display device according to an embodiment of the present disclosure includes a display panel including a plurality of pixels emitting light according to image data and a first memory storing a stress accumulation value corresponding to the image data, wherein the stress accumulation value in the first memory is reset during accumulation of stress values.

DETAILED DESCRIPTION OF THE INVENTION

Hereinafter, preferred embodiments will be described in detail with reference to the attached drawings. The same reference numbers will be used throughout the specification to refer to the same or like parts. In the following description, a detailed description of known functions or configurations incorporated herein will be omitted when it may obscure the subject matter of the present disclosure.

Figure 1:
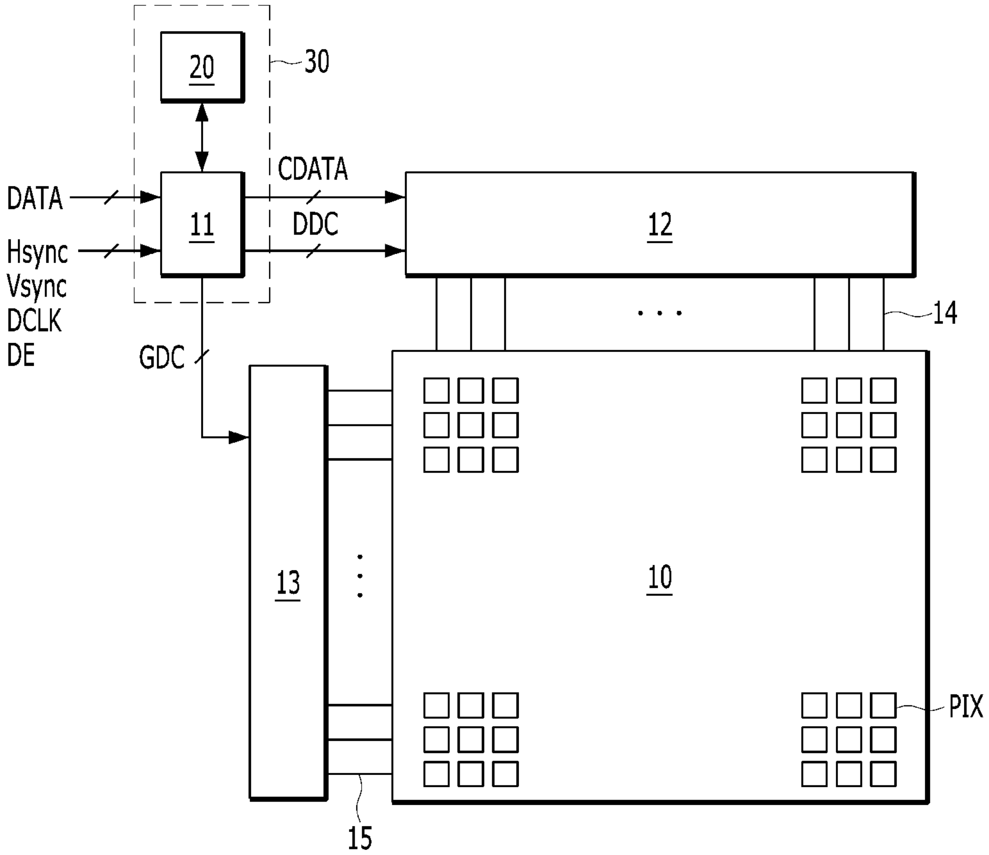
FIG. 1 is a block diagram showing an electroluminescent display device according to an embodiment of the present disclosure.

FIG. 1 is a block diagram showing an electroluminescent display device according to an embodiment of the present disclosure.

Referring to FIG. 1, the electroluminescent display device according to an embodiment of the present disclosure may include a display panel 10, a timing controller 11, a data driver 12, a gate driver 13, a memory circuit 20, and a compensation circuit 30. In FIG. 1, all or parts of the timing controller and the data driver 12 may be integrated into a drive integrated circuit. In FIG. 1, the timing controller 11 and the memory circuit 20 may constitute the compensation circuit 30.

Data lines 14 extending in a column direction (or vertical direction) and gate lines 15 extending in a row direction (or horizontal direction) intersect in a screen in which an input image is displayed in the display panel 10, and pixels PIX are disposed at intersections in a matrix form to form a pixel array. Each data line 14 is commonly connected to pixels PIX neighboring in the column direction and each gate line 15 is commonly connected to pixels PIX neighboring in the row direction.

The pixels PIX included in the pixel array may express various colors by being grouped into a plurality of pixel groups. When a pixel group for color expression is defined as a unit pixel, one unit pixel may include R (red), G (green), and B (blue) pixels or may include R (red), G (green), B (blue), and W (white) pixels.

Each pixel PIX includes a light-emitting element and a driving element that generates emission current according to a gate-source voltage to drive the light-emitting element. The light-emitting element may include an anode, a cathode, and an organic compound layer formed between the anode and the cathode. The organic compound layer may include a hole injection layer (HIL), a hole transport layer (HTL), an emission layer (EML), an electron transport layer (ETL), and an electron injection layer (EIL), but the present disclosure is not limited thereto. When pixel current flows through the light-emitting element, holes that have passed through the hole transport layer (HTL) and electrons that have passed through the electron transport layer (ETL) move to the emission layer (EML) to form excitons, and thus the emission layer (EML) can emit visible light. The organic compound layer may be replaced with an inorganic compound layer.

The driving element may be implemented as a low-temperature polysilicon (LTPS) or an oxide thin film transistor based on a glass substrate (or plastic substrate), but the present disclosure is not limited thereto. The driving element may be implemented as a CMOS transistor based on a silicon wafer.

Attempts to implement some elements (particularly, a switching element having a source or a drain connected to a gate of a driving element) included in a pixel circuit as an oxide transistor are increasing. The oxide transistor uses an oxide, that is, IGZO, obtained by combining indium (In), gallium (Ga), zinc (Zn), and oxygen (0), instead of polysilicon as a semiconductor material. The oxide transistor has the advantages that electron mobility is ten or more times that of an amorphous silicon transistor and manufacturing cost is considerably lower than that of the LTPS transistor. Further, the oxide transistor has high operation stability and reliability in a low-speed operation in which an off period of the transistor is relatively long because it has low off current. Accordingly, the oxide transistor may be employed for OLED TVs that require high definition and low-power operation or cannot obtain a screen size using a low-temperature polysilicon process.

Although all pixels need to have uniform electrical characteristics (e.g., an operating point voltage or a threshold voltage) of light-emitting elements, there may be electrical characteristic differences between pixels PIX due to stress with lapse of driving time (hereinafter referred to as deterioration deviations between pixels).

The compensation circuit 30 uses a data counting compensation technique to compensate for deterioration deviations between pixels. The data counting compensation technique is a technique of predicting a degree of deterioration of light-emitting elements through input image data DATA, deriving a compensation gain for compensating for the deterioration, and then correcting the input image data DATA on the basis of the compensation gain. The compensation circuit converts the input image data DATA into a stress value, accumulates the stress value, and derives a compensation gain using a relation between a modeled stress accumulation value and a compensation gain. The size of the compensation gain increases with lapse of driving time, that is, as a stress accumulation value increases. The compensation circuit 30 resets a stress accumulation value stored in a memory whenever the compensation gain changes in order to reduce memory capacity for storing stress accumulation values.

The compensation circuit 30 applies the compensation gain to the input image data DATA to generate corrected image data CDATA and provides the corrected image data CDATA to the data driver 12. The timing controller 11 included in the compensation circuit 30 receives timing signals such as a vertical synchronization signal Vsync, a horizontal synchronization signal Hsync, a data enable signal DE, and a dot clock signal DCLK from a host system and generates timing control signals for controlling operation timing of the data driver 12 and the gate driver 13. The timing control signals may include a gate timing control signal GDC and a data timing control signal DDC.

The data driver 12 is connected to the pixels PIX through the data lines 14. The data driver 12 generates a data voltage necessary to drive the pixels PIX and provides the data voltage to the data lines 14. The data driver 12 samples and latches the corrected image data CDATA input from the compensation circuit 30 on the basis of the data timing control signal DDC to convert the corrected image data CDATA into parallel data and converts the parallel data into analog data voltages according to gamma compensation voltages. The data voltages may be analog voltage values at different voltage levels to correspond to image grayscales represented in the pixels PIX.

The data driver 12 may be composed of a plurality of source driver integrated circuits. Each source driver integrated circuit may include a shift register, a latch, a level shifter, a digital-to-analog converter (DAC), and an output buffer.

The gate driver 13 is connected to the pixels PIX through the gate lines 15. The gate driver 13 generates scan signals on the basis of the gate timing control signal GDC and provides the scan signals to the gate lines 15 at data voltage supply timing. A horizontal pixel line to which data voltages will be supplied is selected according to a scan signal. Each scan signal may be generated as a pulse type signal that swings between a gate on voltage and a gate off voltage. The gate on voltage is set to a voltage higher than a threshold voltage of a transistor and the gate off voltage is set to a voltage lower than the threshold voltage of the transistor. The transistor is turned on in response to the gate on voltage and turned off in response to the gate off voltage.

The gate driver 13 may be composed of a plurality of gate drive integrated circuits each including a gate shift register, a level shifter for converting an output signal of the gate shift register into a swing width suitable to operate transistors of pixels, and an output buffer. Alternatively, the gate driver 13 may be directly formed on a substrate of the display panel 10 in a gate driver in panel (GIP) structure. In the case of the GIP structure, the level shifter may be mounted on a printed circuit board (PCB) and the gate shift register may be formed in a bezel area that is a non-display area of the display panel 10. The gate shift register includes a plurality of scan output stages connected in a cascading manner. The scan output stages are independently connected to the gate lines to output scan signals to the gate lines 15.

The memory circuit 20 may include a first memory in which stress accumulation values are stored and a second memory in which compensation gains are stored. The first memory is reset whenever a compensation gain changes during accumulation of stress values such that only a stress accumulation value for each period is stored therein. Since the first memory stores only a stress accumulation value for each period corresponding to each compensation gain in association with a reset operation, instead of storing all stress accumulation values with lapse of driving time, memory capacity necessary for compensation can be considerably reduced and a data compression logic can be removed from the timing controller 11. Reduction in the capacity of the first memory causes manufacturing cost reduction, and a loading time for the first memory decreases to reduce a power on time. Furthermore, the circuit size of the timing controller 11 is reduced because the data compression logic is eliminated.

Figure 2:
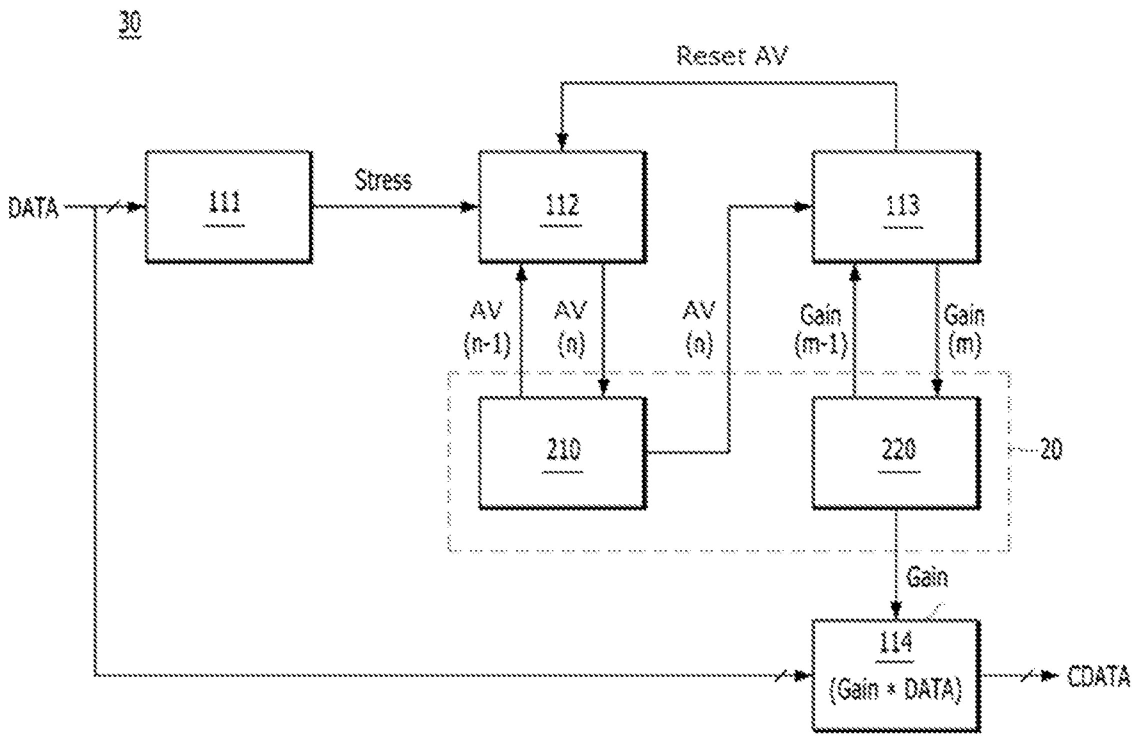
FIG. 2 is a block diagram showing a compensation circuit according to an embodiment of the present disclosure.

FIG. 2 is a block diagram showing the compensation circuit 30 according to an embodiment of the present disclosure. FIG. 3 to FIG. 11 are reference diagrams necessary to describe the compensation circuit 30.

Referring to FIG. 2, the compensation circuit 30 may include a stress conversion circuit 111, a stress accumulation circuit 112, a compensation gain calculation circuit 113, a data compensation circuit 114, a first memory 210, and a second memory 220.

Figure 3:
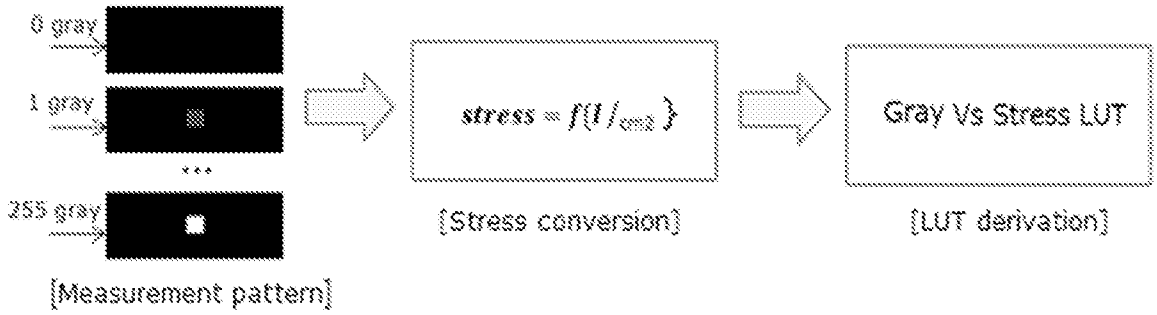
FIG. 3 is a diagram for describing operation of a stress conversion circuit of FIG. 2.

The stress conversion circuit 111 derives a stress value corresponding to each grayscale of input image data DATA with reference to a preset stress conversion look-up table LUT, as shown in FIG. 3. A stress value indicates a predicted deterioration amount of a light-emitting element. The stress value corresponding to each grayscale of the input image data DATA is mapped to the stress conversion look-up table LUT. The stress conversion look-up table LUT may be generated in advance through a measurement pattern application process and a stress value conversion process. In the measurement pattern application process, a measurement pattern for each grayscale is applied to a display panel to measure current in an initial state before deterioration. In the stress value conversion process, the measured current value is converted into a stress value using a predetermined functional formula.

The stress accumulation circuit 112 stores the stress value derived by the stress conversion circuit 111 in the first memory 210.

Figure 4:
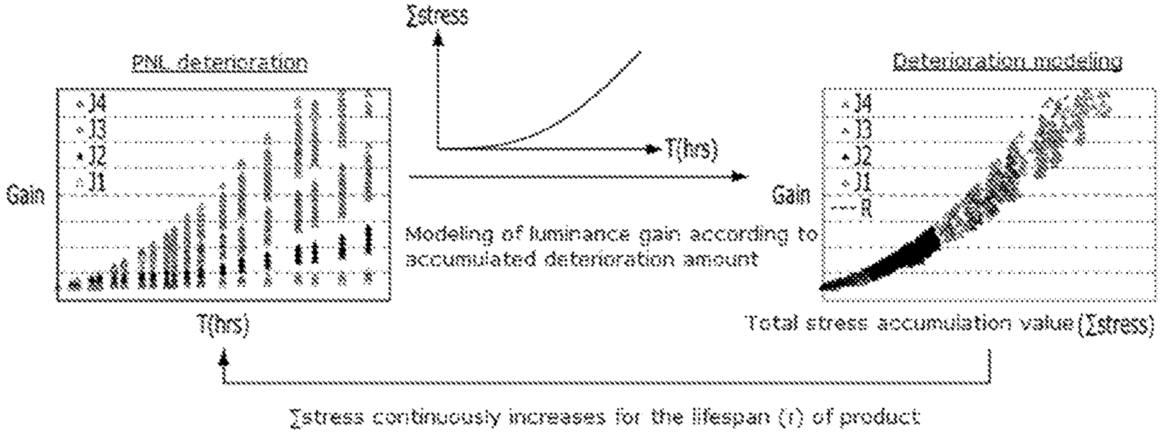
FIG. 4 is a diagram for describing a deterioration modeling process performed in a compensation gain calculation circuit of FIG. 2.
Figures 5, 6:
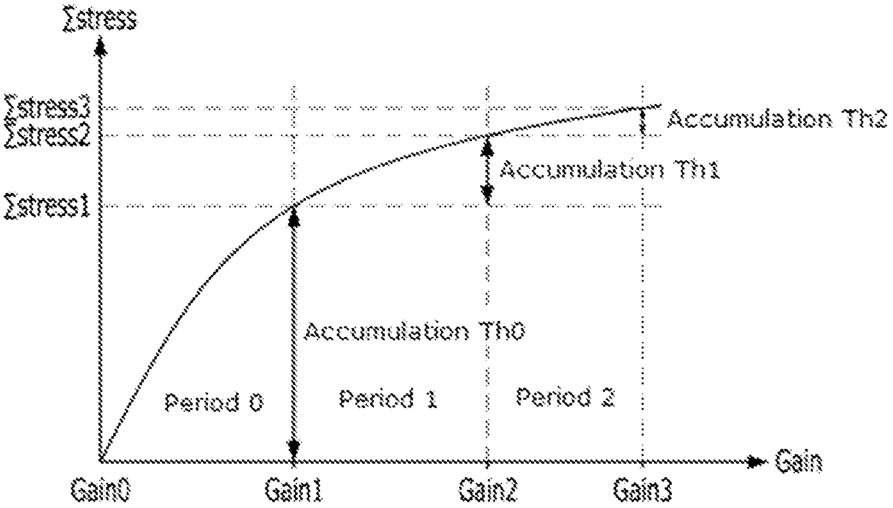
FIG. 5 is a diagram showing an embodiment with respect to a deterioration modeling graph showing a relation between a compensation gain and accumulation data for each period.
FIG. 6 is a diagram showing a look-up table in which compensation gains are mapped to threshold stress accumulation values.

The compensation gain calculation circuit 113 derives a current compensation gain by applying a current stress accumulation value AV read from the first memory 210 to a deterioration modeling graph as shown in FIG. 5. Then, the compensation gain calculation circuit 113 derives, from the current compensation gain corresponding to the current stress accumulation value AV, a threshold stress accumulation value (accumulation Th) corresponding thereto. Here, the compensation gain calculation circuit 113 may ascertain the threshold stress accumulation value Th mapped to the current compensation gain using a threshold value derivation look-up table LUT as shown in FIG. 6. The deterioration modeling graph of FIG. 5 may be generated in advance through a deterioration modeling process as shown in FIG. 4. Deterioration modeling shown in FIG. 4 is a process of modeling a luminance gain (compensation gain) over time into a luminance gain according to an accumulated deterioration amount (accumulated stress value).

The compensation gain calculation circuit 113 compares the current stress accumulation value AV with the threshold stress accumulation value (threshold Th) corresponding thereto, increases the current compensation gain if the current stress accumulation value AV is greater than the threshold stress accumulation value (threshold Th) corresponding thereto as a comparison result, and stores the updated compensation gain in the second memory 220.

The compensation gain calculation circuit 113 performs a reset operation on the current stress accumulation value AV when increasing the current compensation gain. Accordingly, the stress accumulation values AV stored in the first memory 210 are reset and removed from the first memory 210 whenever the compensation gain increases. Due to this reset operation for the first memory 210, a maximum required capacity of the first memory 210 may be determined depending on a specific compensation period of the deterioration modeling graph (refer to FIG. 5) showing a relation between a stress accumulation value Σstress and a compensation gain Gain. Here, a maximum capacity of the first memory 210 necessary for stress value accumulation can be considerably reduced because there is a single specific compensation gain period. The specific compensation gain period is a compensation gain period having a highest slope of the deterioration modeling graph. In the deterioration modeling graph of FIG. 5, compensation gain period 0 corresponds to the specific compensation gain period.

For reference, in FIG. 5, compensation gain 0 is applied to compensation gain period 0 and mapped to a threshold stress accumulation value Th0. Compensation gain 1 is applied to compensation gain period 1 and mapped to a threshold stress accumulation value Th1. In addition, compensation gain 2 is applied to compensation gain period 2 and is mapped to the threshold stress accumulation value Th2. When a compensation gain is implemented as 8 bits, compensation gains 3 to 255 may be applied to compensation gain periods corresponding thereto and mapped to threshold stress accumulation values corresponding thereto in the aforementioned manner. The compensation gains have sizes of compensation gain 0<compensation gain 1<compensation gain 2<compensation gain 3 . . . <compensation gain 255 (refer to FIG. 11).

The first memory 210 stores stress accumulation values Δ(Σstress) for each period. Specifically, when a first compensation gain period to which a first compensation gain is applied and a second compensation gain period to which a second compensation gain greater than the first compensation gain is applied are preset in the deterioration modeling graph, the first memory 210 stores only stress accumulation values Δ(Σstress) corresponding to the first compensation gain period and the second compensation gain period, instead of storing a total of stress accumulation values Σstress corresponding to all compensation gain periods.

Figure 7:
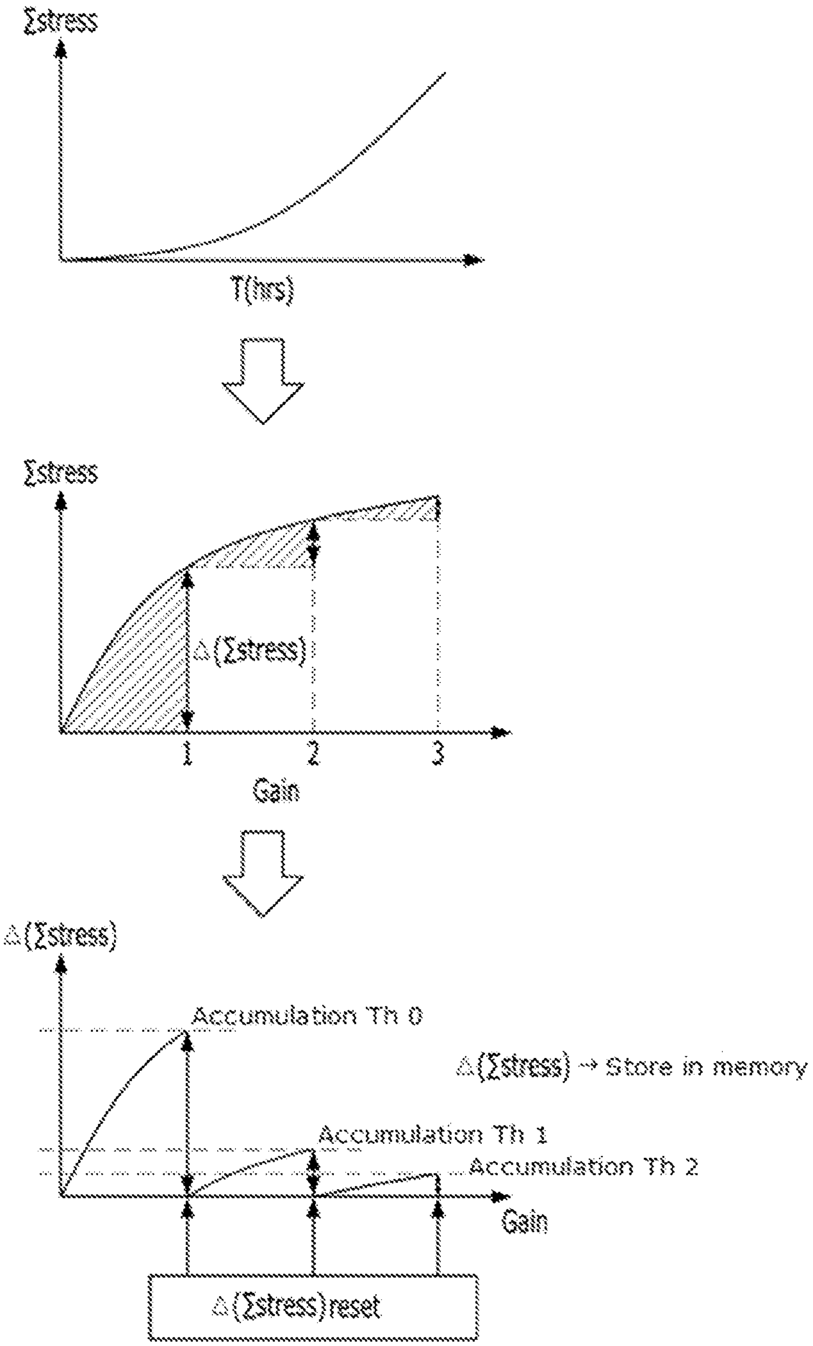
FIG. 7 is a diagram for describing an accumulated deterioration amount resetting operation for resetting accumulation data whenever a compensation gain is updated.

Stress accumulation values Δ(Σstress) for respective periods correspond to threshold stress accumulation values, as shown in FIG. 5 and FIG. 7. A first period stress accumulation value Th0 may correspond to compensation gain period 0, a second period stress accumulation value Th1 may correspond to compensation gain period 1, and a third period stress accumulation value Th2 may correspond to compensation gain period 2. The stress accumulation values Δ(Σstress) for respective periods have sizes of Th0>Th1>Th2.

A stress accumulation value Δ(Σstress) of a previous period in the first memory 210 is reset such that only a stress accumulation value Δ(Σstress) of a following period is stored in the first memory 210. In other words, a stress accumulation value stored in the first memory 210 is reset when a compensation gain period changes during accumulation of stress values. For example, the first period stress accumulation value corresponding to the first compensation gain period is reset and removed from the first memory 210 before the second period stress accumulation value corresponding to the second compensation gain period is stored in the first memory 210.

Figure 8:
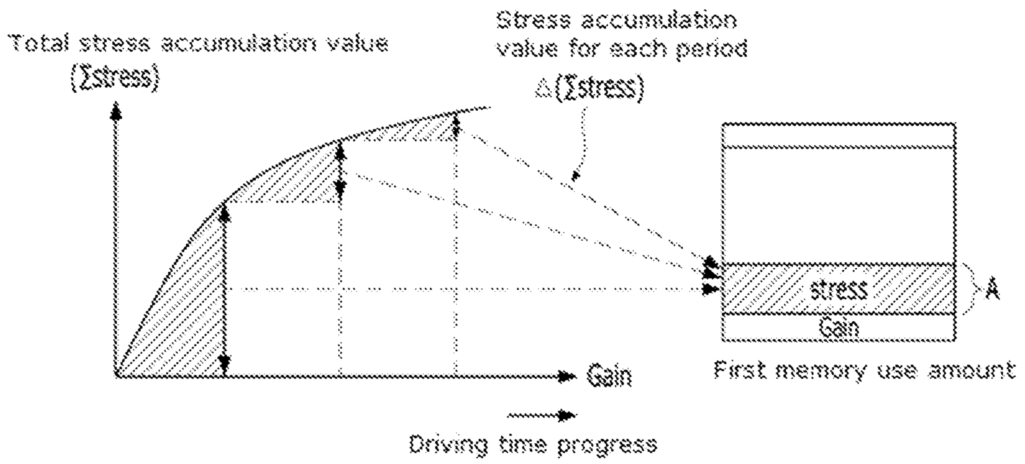
FIG. 8 is a diagram for describing reduction in memory use amount implemented through the accumulated deterioration amount resetting operation of FIG. 7.

FIG. 8 illustrates update of stress accumulation values Δ(Σstress) for respective periods to the first memory 210 through reset and storage processes. As can be clearly ascertained from FIG. 8, a maximum required capacity of the first memory 210 is "A" which is determined depending on the size of the first period stress accumulation value Th0 corresponding to compensation gain period 0 having a highest slope of the deterioration modeling graph. This is because second to m-th (m being a positive integer equal to or greater than 3) period stress accumulation values Th1 and Th2, . . . Thm−1 are less than the first period stress accumulation value Th0.

Figure 9:
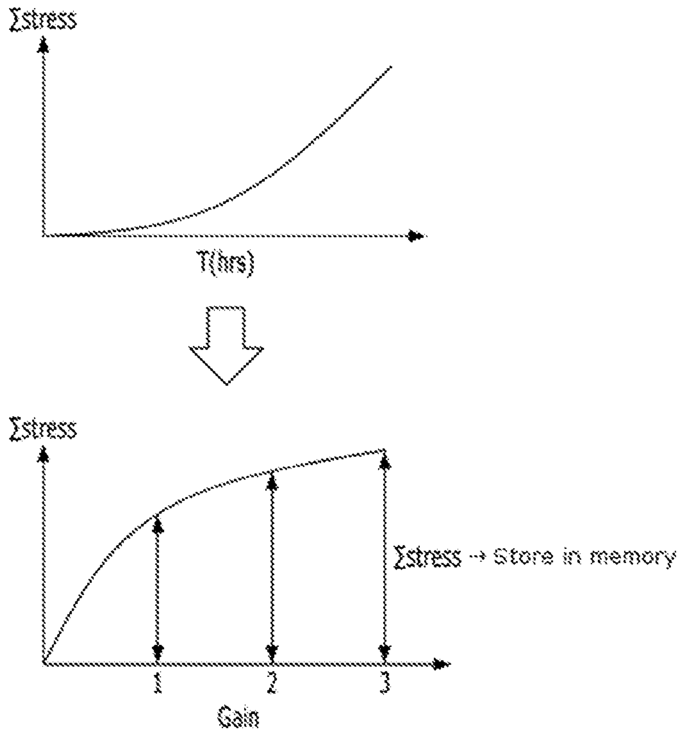
FIG. 9 is a diagram showing a comparative example with respect to a graph showing a relation between a compensation gain and accumulation data for each period.
Figures 10, 11:
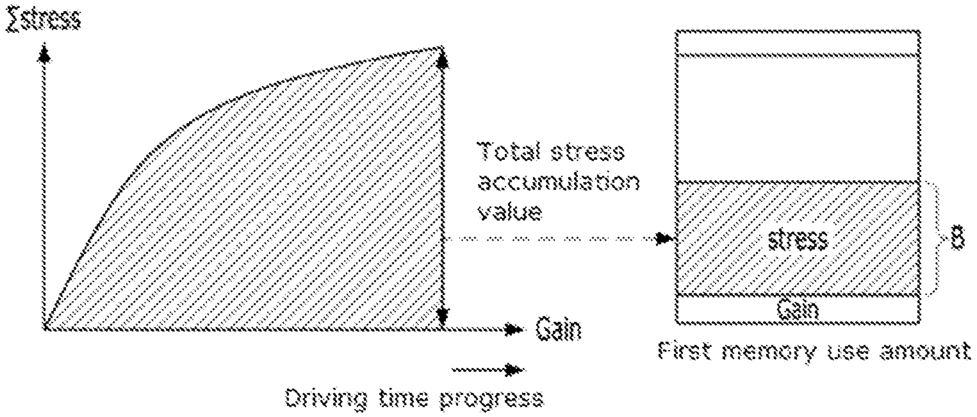
FIG. 10 is a diagram for describing increase in memory use in the comparative example of FIG. 9.
FIG. 11 is a diagram for describing operation of a data compensation circuit.

The memory storage method of an embodiment as illustrated in FIG. 8 can considerably reduce a maximum required capacity of the first memory 210 as compared to a comparative example shown in FIG. 9 and FIG. 10. In the case of the comparative example of FIG. 9 and FIG. 10, the first memory 210 needs to store a total of stress accumulation values Σstress of all compensation gain periods and thus a maximum required capacity B thereof should be relatively large. In other words, the maximum required capacity B of the first memory 210 needs to be sufficiently large in consideration of driving time because a total stress accumulation value Σstress continuously increases over the lifespan of the product. Increase in the maximum required capacity B of the first memory 210 causes the manufacturing cost and memory loading time to increase.

The second memory 220 stores a compensation gain derived by the compensation gain calculation circuit 113. The compensation gain may be stored in the second memory 220 such that it is classified according to a luminance range as shown in FIG. 11, but the present disclosure is not limited thereto. Selection of luminance ranges may be determined according to design specifications. Since the compensation gain is greater than 1, luminance decrease due to deterioration can be compensated. In the same luminance range, a compensation gain increases with lapse of driving time.

The data compensation circuit 114 uses a compensation gain read from the second memory 220 for data correction. The data compensation circuit 114 multiplies the input image data DATA by the compensation gain to generate corrected image data CDATA. The corrected image data CDATA is a value obtained by compensating for luminance decrease due to deterioration of light-emitting elements.

Figure 12:
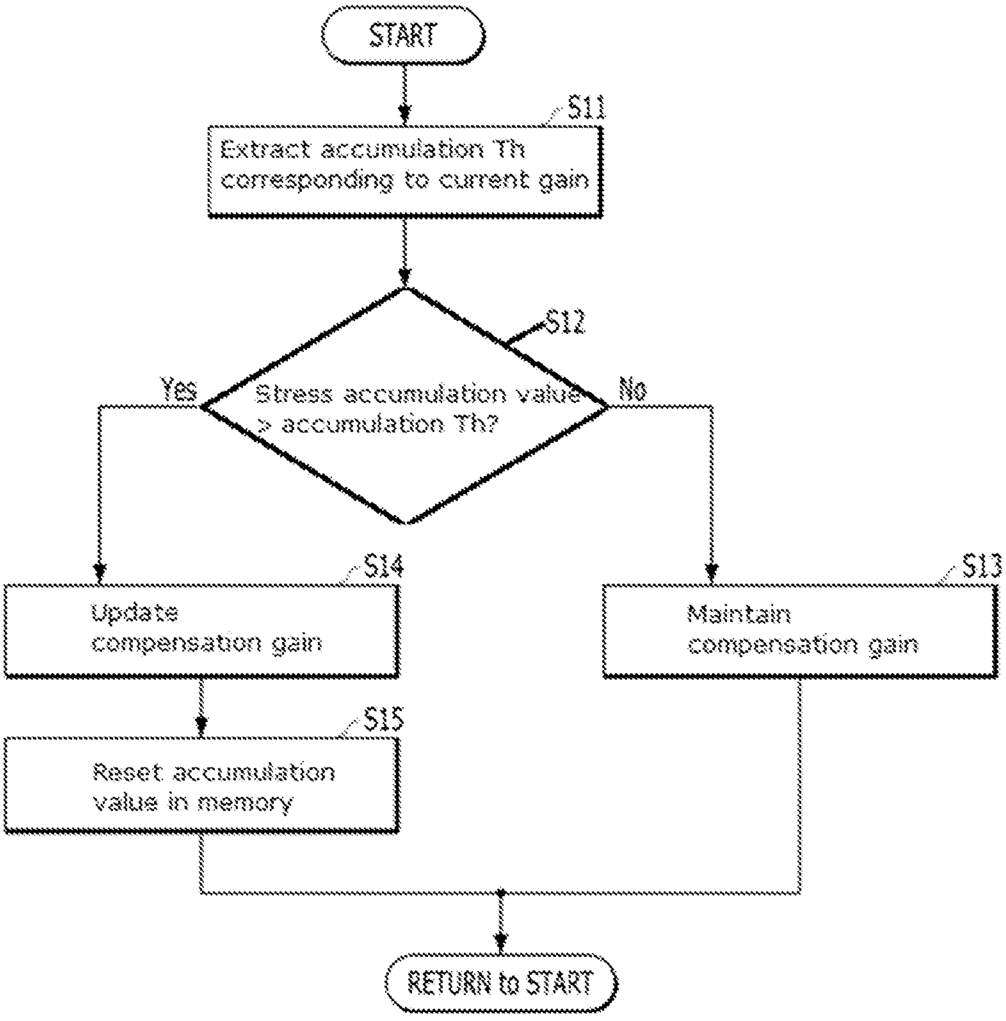
FIG. 12 is a flowchart showing a method for driving an electroluminescent display device according to an embodiment of the present disclosure.

FIG. 12 is a flowchart showing a method for driving an electroluminescent display device according to an embodiment of the present disclosure.

Referring to FIG. 12, the method for driving an electroluminescent display device derives a threshold stress accumulation value from a current compensation gain corresponding to a current stress accumulation value (S11).

The method for driving the electroluminescent display device compares the current stress accumulation value with the corresponding threshold stress accumulation value (accumulation Th) (S12), maintains the current compensation gain if the current stress accumulation value is equal to or less than the corresponding threshold stress accumulation value (accumulation Th) (S13), and increases the current compensation gain if the current stress accumulation value is greater than the corresponding threshold stress accumulation value (accumulation Th) (S14).

The method for driving the electroluminescent display device resets the current stress accumulation value when increasing the current compensation gain (S15).

As described above, the present embodiment resets a memory whenever a compensation gain changes during accumulation of stress values and stores only a stress accumulation value for each period in the memory. The present embodiment stores only a stress accumulation value for each period corresponding to each compensation gain in the memory in association with a reset operation, instead of storing a total stress accumulation value with lapse of driving time. Accordingly, the present embodiment can considerably reduce memory capacity necessary for compensation and eliminate an additional data compression logic. According to the present embodiment, manufacturing cost is reduced due to decrease in the memory capacity, and a memory loading time is decreased to reduce a power on time. Furthermore, according to the present embodiment, the circuit size and manufacturing cost of the timing controller are reduced because the additional data compression logic is not necessary.

The present embodiment has the following advantages.

The present embodiment resets a memory whenever a compensation gain changes during accumulation of stress values and stores only a stress accumulation value for each period in the memory. The present embodiment stores only a stress accumulation value for each period corresponding to each compensation gain in the memory in association with a reset operation instead of storing a total stress accumulation value with lapse of driving time. Accordingly, the present embodiment can considerably reduce memory capacity necessary for compensation and eliminate an additional data compression logic. According to the present embodiment, manufacturing cost is reduced due to decrease in the memory capacity, and a memory loading time is decreased to reduce a power on time. Furthermore, according to the present embodiment, the circuit size and manufacturing cost of the timing controller are reduced because the additional data compression logic is not necessary.

It will be appreciated by persons skilled in the art that the effects that can be achieved with the present disclosure are not limited to what has been particularly described hereinabove and other advantages of the present disclosure will be more clearly understood from the following detailed description.

Those skilled in the art will appreciate that various modifications and variations can be made in the present disclosure without departing from the spirit or scope of the invention. Accordingly, the scope of the present disclosure should be determined by the appended claims and their legal equivalents, not by the above description.

What is claimed is:

1. An electroluminescent display device, comprising:

a display panel including a plurality of pixels emitting light according to image data;

a first memory storing a first stress accumulation value corresponding to the image data, the first stress accumulation value being an accumulation of stress values indicative of predicted deterioration amounts of the pixels corresponding to gray scales of the image data; and a compensation gain calculation circuit configured to increase a compensation gain for compensating for the image data on the basis of the first stress accumulation value, wherein the first stress accumulation value in the first memory is reset to a second stress accumulation value that is less than the first stress accumulation value and the first stress accumulation value is removed from the first memory in response to increase of the compensation gain.

2. The electroluminescent display device of claim 1, wherein a maximum required capacity of the first memory is determined according to a compensation gain period of a deterioration modeling graph showing a relation between the stress accumulation value and the compensation gain.

3. The electroluminescent display device of claim 2, wherein the compensation gain period has a highest slope of the deterioration modeling graph.

4. The electroluminescent display device of claim 2, wherein the compensation gain period is a first compensation gain period having a first value as the compensation gain in the deterioration modeling graph.

5. The electroluminescent display device of claim 4, wherein a first threshold stress accumulation value of the first compensation gain period is greater than a second threshold stress accumulation value of a second compensation gain period having a second value as the compensation gain, and the second value is greater than the first value.

6. The electroluminescent display device of claim 2, wherein a first compensation gain period to which a first compensation gain is applied and a second compensation gain period to which a second compensation gain is applied are preset in the deterioration modeling graph, the first memory stores stress accumulation values corresponding to the first compensation gain period and the second compensation gain period, and a first period stress accumulation value corresponding to the first compensation gain period in the first memory is reset before a second period stress accumulation value corresponding to the second compensation gain period is stored in the first memory.

7. The electroluminescent display device of claim 1, wherein the compensation gain calculation circuit derives a threshold stress accumulation value from a current compensation gain corresponding to the first stress accumulation value, and increases the current compensation gain when the first stress accumulation value increases to exceed the threshold stress accumulation value.

8. An electroluminescent display device, comprising:

a display panel including a plurality of pixels emitting light according to image data; and a first memory storing a first stress accumulation value corresponding to the image data, the first stress accumulation value being an accumulation of stress values indicative of predicted deterioration amounts of the pixels corresponding to gray scales of the image data, wherein the first stress accumulation value in the first memory is reset to a second stress accumulation value that is less than the first stress accumulation value and the first stress accumulation value is removed from the first memory during accumulation of the stress values.

9. The electroluminescent display device of claim 8, wherein a maximum required capacity of the first memory is determined depending on a compensation gain period of a deterioration modeling graph showing a relation between a compensation gain for compensating for the image data and the stress accumulation value.

10. The electroluminescent display device of claim 9, wherein the compensation gain period has a highest slope in the deterioration modeling graph.

11. The electroluminescent display device of claim 9, wherein the first stress accumulation value in the first memory is reset when a compensation gain period of the deterioration modeling graph changes during accumulation of the stress values.

12. The electroluminescent display device of claim 9, wherein the first stress accumulation value stored in the first memory for a first compensation gain period to which a first compensation gain is applied is greater than the second stress accumulation value stored in the first memory for a second compensation gain period to which a second compensation gain is applied, and the second compensation gain is greater than the first compensation gain.

13. A method for driving an electroluminescent display device including a plurality of pixels emitting light according to image data, the method comprising;

storing a first stress accumulation value corresponding to the image data in a first memory, the first stress accumulation value being an accumulation of stress values indicative of predicted deterioration amounts of the pixels corresponding to gray scales of the image data;

increasing a compensation gain for compensating for the image data on the basis of the stress accumulation value; and resetting the first stress accumulation value in the first memory to a second stress accumulation value that is less than the first stress accumulation value and removing the first stress accumulation value in the first memory in response to increase of the compensation gain.

14. A method for driving an electroluminescent display device including a plurality of pixels emitting light according to image data, the method comprising;

storing a first stress accumulation value corresponding to the image data in a first memory, the first stress accumulation value being an accumulation of stress values indicative of predicted deterioration amounts of the pixels corresponding to gray scales of the image data; and resetting the first stress accumulation value in the first memory to a second stress accumulation value that is less than the first stress accumulation value and removing the first stress accumulation value in the first memory during accumulation of the stress values.

* * * * *